United States Patent [19]

Swarr et al.

[11] Patent Number: 4,714,586
[45] Date of Patent: Dec. 22, 1987

[54] METHOD OF PREPARING A DIMENSIONALLY STABLE ELECTRODE FOR USE IN A MCFC

[75] Inventors: Thomas E. Swarr, South Windsor; Wayne G. Wnuck, Stafford Springs, both of Conn.

[73] Assignee: The United States of America as represented by the United States Department of Energy, Washington, D.C.

[21] Appl. No.: 823,718

[22] Filed: Jan. 29, 1986

[51] Int. Cl.$^4$ .................. B22F 3/10; C22C 32/00
[52] U.S. Cl. .................. 419/2; 419/19; 419/57; 148/427
[58] Field of Search .............. 419/2, 19, 57; 148/427; 420/442

[56] References Cited

U.S. PATENT DOCUMENTS

| | | | |
|---|---|---|---|
| 3,946,039 | 3/1976 | Walz | 264/332 |
| 4,206,270 | 6/1980 | Kunz et al. | 429/40 |
| 4,225,346 | 9/1980 | Hellicker et al. | 419/2 |
| 4,239,557 | 12/1980 | Thellman et al. | 148/126 |
| 4,411,968 | 10/1983 | Reiser et al. | 429/41 |
| 4,507,262 | 3/1985 | Karas et al. | 419/2 |
| 4,514,475 | 4/1985 | Mientak | 429/35 |

OTHER PUBLICATIONS

Hausner, "Handbook of Powder Metallurgy" 1973, pp. 10-15 and 18-19.
Pigeaud, "Development of Molten Carbonate Fuel Cell Technology, 1980.
"Development of Molten Carbonate Fuel Cell Power Plant Technology, 1981, Report #9.
"Development of Molten Carbonate Fuel Cell Technology, 4/1982, Report #10.
Development of Molten Carbonate Fuel Cell Technology, 7/1981, Report #7.
Development of Molten Carbonate Fuel Cell Technology, 2/83, Report #8.

Primary Examiner—John F. Terapane
Assistant Examiner—Eric Jorgensen
Attorney, Agent, or Firm—Hugh W. Glenn; Robert J. Fisher; Judson R. Hightower

[57] ABSTRACT

A method is disclosed for preparing a dimensionally stable electrode structure, particularly nickel-chromium anodes, for use in a molten carbonate fuel cell stack. A low-chromium to nickel alloy is provided and oxidized in a mildly oxidizing gas of sufficient oxidation potential to oxidize chromium in the alloy structure. Typically, a steam/$H_2$ gas mixture in a ratio of about 100/1 and at a temperature below 800° C. is used as the oxidizing medium. This method permits the use of less than 5 weight percent chromium in nickel alloy electrodes while obtaining good resistance to creep in the electrodes of a fuel cell stack.

9 Claims, 2 Drawing Figures

METHOD OF PREPARING A DIMENSIONALLY STABLE ELECTRODE FOR USE IN A MCFC

CONTRACTUAL ORIGIN OF THE INVENTION

The U.S. Government has rights in this invention pursuant to Contract No. DE-AC01-79ET15440 between the U.S. Department of Energy and United Technologies Corporation.

BACKGROUND OF THE INVENTION

This invention relates to the production of electrodes for use in molten carbonate fuel cells. In particular it is concerned with anode structures that tend to creep or otherwise distort within the loaded conditions of a fuel cell stack. A typical fuel cell stack for commercial or utility use may contain hundreds of electrodes.

Fuel cells with alkali-metal carbonates as electrolyte are well known and are generally referred to as molten carbonate fuel cells. Such fuel cells and stacks of cells are illustrated and described in U.S. Pat. No. 4,514,475 to Mientek; U.S. Pat. No. 4,411,968 to Reiser et al. and U.S. Pat. No. 4,206,270 to Kunz et al.

Molten carbonate fuel cells have used porous plaques of nickel and nickel alloy as anode structures. These anodes tend to be dimensionally unstable losing thickness by creep distortion within the fuel cell stack. It is well accepted to use chromium additive into the nickel anodes to enhance the structural stability of the plaque. In U.S. Pat. No. 4,239,557 to Thellmann et al., nickel anodes with up to 30 weight percent chromium are disclosed as being thermally stable at elevated temperatures. Typically alloys of at least 10 weight percent chromium are used to stabilize a porous nickel structure for use as a molten carbonate fuel cell anode.

The use of such high levels of chromium in porous nickel anodes not only is expensive but may result in the degeneration of the structure on oxidation of the chromium. Prior efforts to reduce the amount of chromium to less than 5% by weight have resulted in nickel anodes with increased susceptibility to creep under fuel cell stack conditions.

Various efforts have been made to stabilize anode structures with low chromium concentrations. Precipitation hardening with elements such as aluminum or titanium in small proportions, solid solution strengthening by impregnating a standard nickel anode with a solution of the strengthening element such as aluminum, copper, tin or chromium and strengthening by second phase dispersed particles, such as $CeO_2$ or $Cr_2O_3$ have been investigated. In some instances promising results have occured. However, in long term operations under simulated fuel cell stack conditions of a hundred hours or more, the initial creep resistance and stability of the anodes have degraded.

Therefore, in view of the above discussion it is an object of the present invention to provide a method of forming a dimensionally stable electrode structure for molten carbonate fuel cell use.

It is further object to provide a method of preparing a porous anode of nickel and chromium that maintains structural stability in extended use under fuel cell stack conditions.

It is also an object to provide an improved method of producing a porous nickel-chromium alloy with a substantially reduced chromium content over that previously required for long-term stability.

In accordance with the present invention, a method is disclosed for forming a dimensionally stable electrode structure for use in a fuel cell with molten alkali metal carbonate as an eletrolyte. A porous plaque of a nickel-chromium alloy with no more than 5 weight percent chromium is prepared. The chromium is selectively oxidized by exposure to a steam-hydrogen gas mixture containing only a minor proportion of hydrogen in respect to a major proportion of steam at a temperature of at least 600° C. but not more than 800° C.

In further aspects of the invention, the cromium in the plaque is selectively oxidized by exposure to a steam-hydrogen gas mixture at a temperature of 700°-800° C. for at least one hour.

In yet other aspects of the invention, the steam-hydrogen gas is provided in mixture with an inert carrier gas.

In another important aspect of the invention, the steam to hydrogen gas mixture is provided in a volumetric ratio of 80/1 to 120/1 preferably in a steam to hydrogen ratio of about 100/1.

In other aspects of the invention, the porous plaque of nickel has a porosity of about 50 to 60%, a composition of about 98% nickel and 2% chromium by weight, and is formed as a nickel-chromium alloy by heat treating a particulate mixture of nickel and chromium metals of similar particle size for about 5-90 minutes at a temperature of about 1000°-1100° C. preferably about 1050° C. for about 15 minutes.

BRIEF DESCRIPTION OF THE DRAWINGS

The present invention is illustrated in the accompanying drawings wherein.

DETAILED DESCRIPTION OF THE PREFERRED EMBODIMENT

Figure 1:
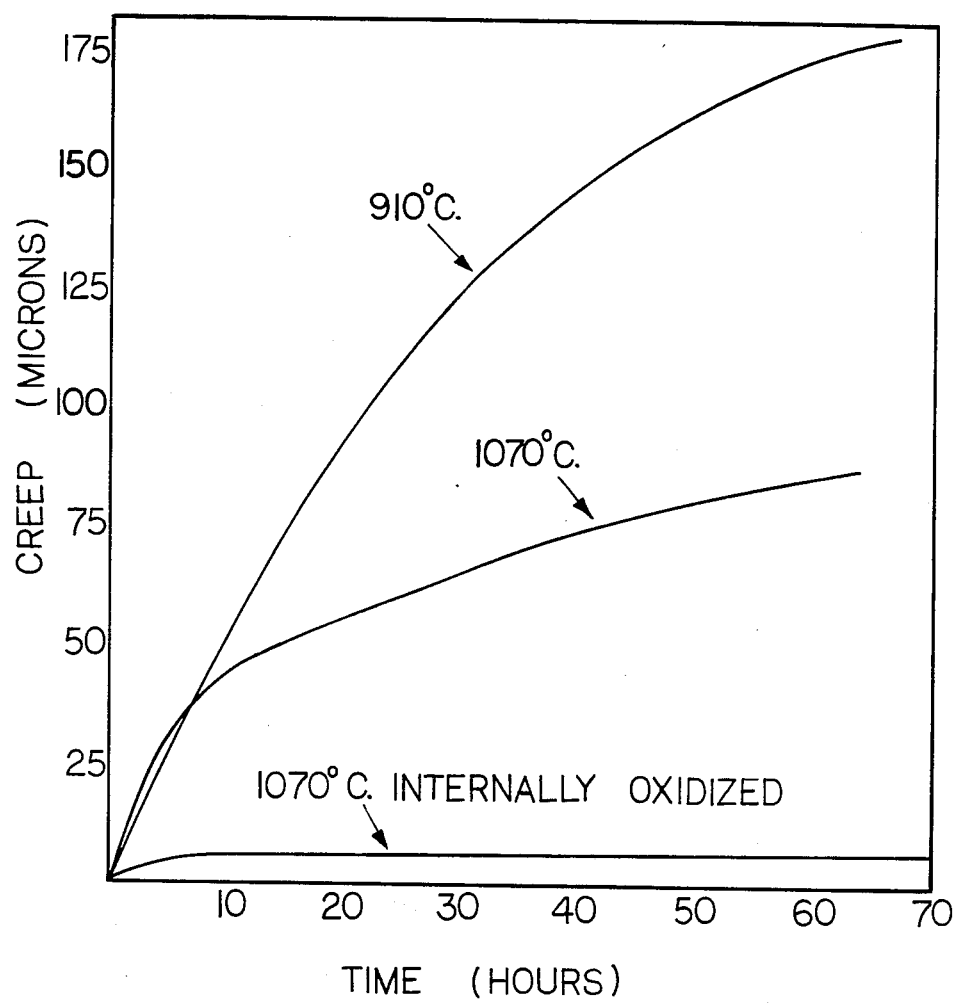
FIG. 1 is a graph showing creep verses time for anode plaques prepared by different methods.

In one manner of preparing the anode structure of the present invention, an alloy of nickel with low chromium content is formed. Although other methods may be used, powder metallurgical techniques conveniently are selected in preparing the porous anode structure.

Compacted powders of uniformly mixed nickel and chromium in the desired proportions are formed. To promote a uniform mixture, the nickel and chromium particles preferrably are provided of about the same particle size. For example, particles sizes in the range of 1-100 microns can be selected for use.

The compact of mixed nickel and chromium powder is sintered and heat treated at elevated temperature to uniformly diffuse the chromium into the nickel and thereby form a nickel-chromium alloy. It has been found that temperatures of about 1000°-1100° C. for 5-90 minutes, preferably about 1050° C. for about 15 minutes, can be used to form a uniform alloy of nickel and chromium at about the 1-4% by weight chromium level.

It is of considerable importance that a uniform alloy be formed in order to obtain the uniform and consistent dispersal of the subsequently oxidized chromium particles within the porous nickel structure. Pockets rich in chromium content can result in a weakened structure on oxidation. Conversely portions of the structure devoid in chromium will exhibit poor structural stability.

Anode structures in excess of 50% porosity are desirable to provide adequate sites for contact of electrolyte and fuel gas. Although some densification occurs at the elevated sintering temperatures required to alloy chromium with nickel, anodes of 50-60% porosity and pore sizes of 2 to 10 microns are consistently prepared by powder metallurgical techniques.

The porous plaque of nickel-chromium alloy is exposed to an oxidizing environment of potential sufficient to oxidize chromium without substantial oxidation of nickel. The inventors have found that this oxidation potential should be as high as possible without affecting the nickel structure. It is important to rapidly oxidize the dispersed chromium within the nickel structure before substantial chromium migration occurs to the surfaces of the nickel particles. Excessive oxidation potential will attack the nickel structure, and subsequent reduction to nickel metal in the fuel gas environment does not restore this structural defect. Low oxidizing environments may oxidize surface chromium and establish a steep chromium concentration gradient that may promote chromium migration.

The desired oxygen potential for selectively oxidizing the chromium at a rapid rate in-situ can be provided by carefully managed techniques. In laboratory efforts, a pack of nickel and nickel oxide powder is maintained in contact around the anode structure at elevated temperatures. A nickel-to-nickel oxide ratio of about 1 to 8 by weight can provide a partial pressure of oxygen of suitable oxidizing potential.

In a preferred method, an equilibrium oxygen potential is established by the dissociation of steam at elevated temperatures:

$$H_2O \rightleftharpoons H_2 + \tfrac{1}{2}O_2$$

The inventors have found that this equilibrium must be biased with the addition of minor amounts of hydrogen gas to the steam to obtain an oxygen potential which will oxidize the chromium in preference to the nickel. In addition, the oxygen potential must be suitable to oxidize the chromium in situ prior to substantial chromium migration. A steam to hydrogen ratio of about 80/1 to 120/1 by volume is suitable for this purpose. Preferably a steam to hydrogen ratio of about 100/1 is selected for use. In some applications an inert carrier gas, of such as nitrogen, may be used in the gas mixture to provide a desired flow rate and gas distribution.

Elevated temperatures are used to internally oxidize the anode with the steam/hydrogen gas mixture. However, it is of considerable importance that substantial oxidation of chromium in the nickel structure be performed with the oxidizing gas at a temperature of 800° C. or below. This limited temperature may retard chromium migration to improve the creep resistance of the completed anode. As will be seen below, in conjunction with FIG. 2, a substantial improvement in creep resistance results at an oxidizing temperature below 800° C. It also will be seen that exposure to temperatures above 800° C. may not adversely affect creep resistance after substantial oxidation has occurred below 800° C.

Although, the minimum oxidizing temperature may vary with conditions, it is expected that a temperature of at least 600° C. is desirable to promote a practical oxidation rate. Accordingly, the nickel structure is oxidized with the steam-hydrogen gas mixture at a temperature of 600°-800° C. Preferably, a temperature of 700°-800° C. is employed.

Figure 2:
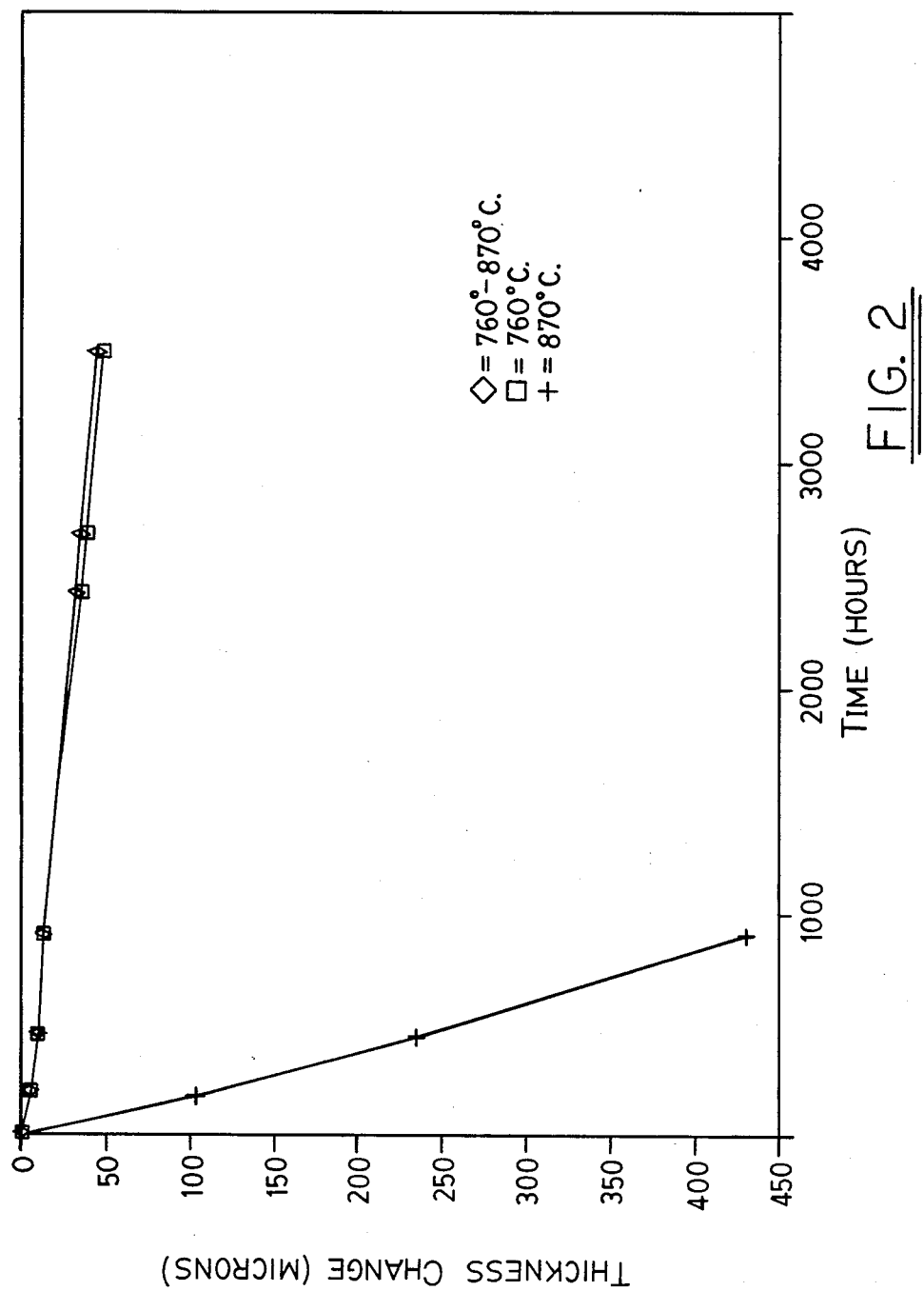
FIG. 2 shows a graph illustrating anode creep over a longer period of time than that in FIG. 1 for anodes selectively oxidized at different conditions.

To illustrate the improvement obtained by the method of this invention, FIGS. 1 and 2 are presented showing thickness reduction or creep for anodes prepared by different methods. FIG. 1 shows the creep record for several anodes over a period of about 70 hours. Creep is expressed in microns of anode thickness reduction.

The anodes of FIG. 1 were prepared by press molding a mixture of about 98% nickel and 2% chromium powder by weight and presintering at about 700° C., to tack the structure together. The temperature then was raised to the sintering temperature and held there for about one hour. One anode was sintered at 910° C., a second at 1070° C. and a third was sintered at 1070° C. The third anode was treated further in a step to internally oxidize the dispersed chromium.

The internal oxidation was conducted by exposing the porous anode structure for about 100 hours to an oxygen atmosphere emitted by a powder pack consisting of about 8 weight parts nickel oxide and 1 weight part nickel metal heated to about 800° C. The anodes with thickness of about 1.6 mm were subjected to static loads of about 7 atmospheres between pressure plates to simulate fuel cell stack conditions. The results shown in FIG. 1 make it clear that after 60 hours only the internally oxidized anode exhibited good creep resistance.

The anodes of FIG. 2 were prepared in a similar manner, and of a similar size to that of the FIG. 1 anodes. However, the chromium was oxidized within the anode structure by exposure to a steam-hydrogen gas mixture of about 100/1 volume ratio. Creep is expressed in microns of thickness reduction.

One anode labeled 760° C. was heated in a 3%$H_2$/$N_2$ gas to thermal equilibrium at 760° C. at which temperature the steam was introduced and maintained in flowing contact with the anode for 24 hours. A second anode labeled 870° C. was heated in a similar manner except that the steam was first introduced at a temperature of 870° C. FIG. 2 shows the excellent creep resistance of the first anode exposed to the oxidizing gas at the lower temperature compared to that of the second anode which suffered a rapid decrease in thickness over time. A third anode in FIG. 2 labeled 760-870C was heated in a manner similar to the other two to 760° C. at which temperature steam was first introduced. The temperature of the anode and oxidizing gas was increased to 870° C. over a period of about 5 hours, and held at that temperature for about 24 hours. FIG. 2 shows that the creep properties of this anode are practically the same as the first anode oxidized isothermally at 760° C., indicating that contact between the oxidizing gas and the anode is necessary at the lower temperature (below about 800° C.) in order to enhance the creep resistance of the anode. This result further indicates that subsequent heating to a temperature in excess of 800° C. does not reverse the beneficial effects achieved from oxidizing at a lower temperature.

From the above it is seen that a substantial improvement in creep resistance of nickel-chromium alloy anodes can be obtained through use of the inventors' preparation procedure. This new procedure permits use of low chromium contents of less than 5 weight percent with good creep characteristics. Improvements in creep resistance are obtained by internally oxidizing only the dispersed chromium at a sufficient rate to achieve in-situ oxidation prior to substantial chromium migration. This is achieved by contacting the anode with an oxidizing gas comprising steam below 800° C. with a minor hydrogen gas addition to retard oxidation of nickel.

Although this invention is described and illustrated with specific materials, process parameters and embodiments, it will be understood by those skilled in the art that variations may be made within the scope of the invention as claimed.

The embodiments of this invention in which an exclusive property or privilege is claimed are defined as follows:

1. A method of forming a dimensionally stable electrode structure for use in a fuel cell stack containing molten alkali metal carbonate electrolyte, said method comprising:
   providing a porous plaque of nickel-chromium alloy having no more than 5 weight percent chromium;
   Selectively oxidizing the chromium in said plaque by exposure for at least one hour to a sufficient oxidizing potential to oxidize chromium in the presence of nickel, said exposure provided by contacting said plaque with a gas mixture containing steam and hydrogen in a volumetric ratio of about 80–120 volumes of steam to one volume of hydrogen at a temperature of 600° C. to 800° C. to form said stable electrode structure.

2. The method of claim 1 wherein the porous plaque of nickel-chromium alloy is formed by providing a porous mixture of nickel metal and chromium metal followed by heat treating said mixture at a temerature of 1000° to 1100° C. for about 5–90 minutes.

3. The method of claim 2 wherein said porous mixture is heat treated at 1050° C. for about 15 minutes to provide a uniform nickel-chromium alloy throughout the plaque.

4. The method of claim 3, wherein the porous plaque has a porosity of about 50–60%.

5. The method of claim 2 wherein the porous plaque of nickel-chromium alloy is formed by sintering and heat treating a mixture of particulate nickel metal and particulate chromium metal, the particles of chromium metal being of about the same size as the particles of nickel metal.

6. The method of claim 1 wherein the chromium in the plaque is selectively oxidized by exposure to a steam-hydrogen gas mixture at a temperature of 700°–800° C.

7. The method of claim 1 wherein the steam-hydrogen gas mixture is provided in a steam/hydrogen volume ratio of about 100/1.

8. The method of claim 1 wherein the steam-hydrogen gas is provided in mixture with an inert carrier gas.

9. The method of claim 1 wherein the porous plaque of nickel-chromium alloy has a composition of about 98% nickel and 2% chromium by weight.

* * * * *